United States Patent [19]

Litva et al.

[11] 4,062,015

[45] Dec. 6, 1977

[54] RAPID AZIMUTHAL DETERMINATION OF RADIO SIGNALS

[76] Inventors: John Litva, 256 Union Street, Almonte, Ontario, Canada, K0A 2C0; Everett Earle Stevens, 113 Marina Drive, Manotick, Ontario, Canada

[21] Appl. No.: 654,018

[22] Filed: Jan. 30, 1976

[30] Foreign Application Priority Data

Jan. 30, 1975 Canada .................................. 219067

[51] Int. Cl.² .......................... G01S 3/20; G01S 3/58
[52] U.S. Cl. .................................... 343/120; 343/118
[58] Field of Search ....................... 343/120, 121, 118

[56] References Cited

U.S. PATENT DOCUMENTS

| | | | |
|---|---|---|---|
| 2,539,402 | 1/1951 | Clark | 343/120 |
| 3,042,917 | 7/1962 | Elhoff | 343/120 |
| 3,054,105 | 9/1962 | Steiner et al. | 343/120 |
| 3,824,596 | 7/1974 | Guion | 343/120 |

*Primary Examiner*—T.H. Tubbesing
*Assistant Examiner*—Richard E. Berger

[57] ABSTRACT

Methods are known for finding the bearing of an incoming radio signal. The system disclosed, which enables accurate bearings of radio signals to be obtained rapidly, employs a rosette array of directional Beverage antennas. The antennas are rapidly scanned to find which one is receiving the largest amplitude signal; this gives an approximate bearing. This signal is then compared with the signals of two adjacent antennas in the array and the results of these comparisons provide a measure of the amount and direction that the true bearing differs from the approximate bearing.

7 Claims, 3 Drawing Figures

FIG. 1

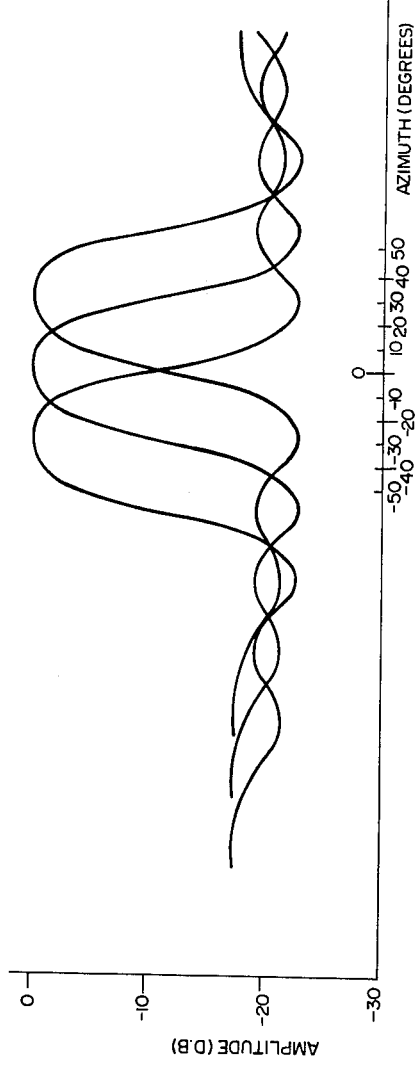
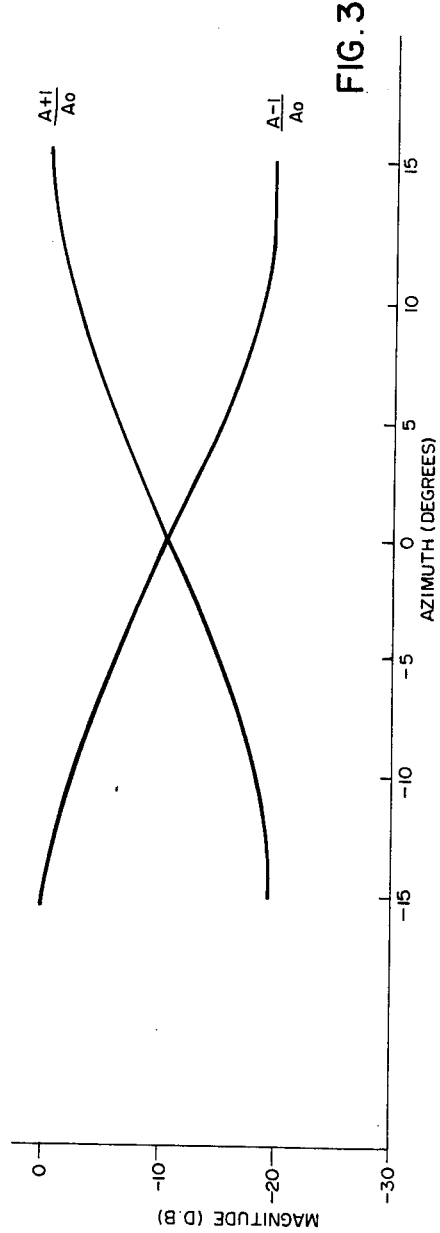

RAPID AZIMUTHAL DETERMINATION OF RADIO SIGNALS

BACKGROUND OF THE INVENTION

This invention relates to a method and system for finding the bearing of a radio signal.

A number of methods are known for finding the bearing of a radio signal. For example, one may use a directional antenna and rotate the antenna until a null is detected. This is, however, rather slow.

SUMMARY OF THE INVENTION

The present invention enables a completely automatic method of obtaining accurate bearings of radio signals and may be useful for numerous applications, e.g. as a surveillance means, in air-sea search and rescue operations, in direction finding applications at monitoring stations, as a scientific tool for radio propagation studies and as a base communication antenna receiving system.

A system of the present invention employs a rosette array consisting of a plurality of directional antennas, e.g. twelve Beverage antennas, that have overlapping field patterns. A diode switch is used to obtain instantaneous sequential samples of the various antenna terminal voltages. The antenna with the largest terminal voltage defines the approximate bearing of the incoming radio signal. The more precise bearing is obtained by comparing the terminal voltages on the two adjacent antennas. The system is capable of giving bearings with an accuracy of the order of + or −1 degree in as little as 12 milliseconds.

Thus, in accordance with the invention, there is provided a method of determining the bearing of a radio signal comprising sequentially scanning a plurality of directional antennas arranged in a rosette array to determine which antenna is receiving the largest amplitude signal which indicates the approximate bearing of the radio signal, and making comparisons of said largest amplitude signal with the signal amplitudes of two adjacent antennas in the array, said comparisons being indicative of the amount and direction that the bearing of the radio signal differs from said approximate bearing.

The largest amplitude signal may be designate $A_0$ and the signal amplitudes of the two adjacent antennas may be designated $A_{+1}$ and $A_{-1}$, said comparisons involving forming the ratios $A_{+1}/A_0$ and $A_{-1}/A_0$, the magnitudes of the ratios being indicative of the amount that the bearing of the radio signal differs from said approximate bearing and the relative magnitudes of the two ratios being indicative of the direction, clockwise or anticlockwise, that the bearing of the radio signal differs from said approximate bearing.

According to another aspect of the invention, there is provided a system for determining the bearing of a radio signal comprising a rosette array of directional antennas, means for sequentially scanning said antennas, means for detecting the amplitudes of signals received by said antennas, means for determining which antenna is receiving the largest amplitude signal to thereby provide an indication of the approximate bearing of the radio signal, means for forming the ratios $A_{+1}/A_0$ and $A_{-1}/A_0$ where $A_0$ is the largest amplitude signal, $A_{+1}$ is the amplitude of signal being received by the antenna next adjacent in the array to the antenna receiving the largest amplitude signal, and $A_{-1}$ is the amplitude of signal being received by the antenna immediately preceding in the array the antenna receiving the largest amplitude signal, and means for determining from the magnitudes of said ratios the amount and direction that the bearing of said radio signal differs from said approximate bearing.

The antennas are preferably Beverage antennas, sometimes termed Wave antennas. Antennas of this type are described, for example, in the book "Antennas" by John D. Kraus, published in 1950 by McGraw-Hill Book Company, Inc. As discussed on pages 412–413 of that book, Beverage antennas consist of a long horizontal wire terminated in its characteristic impedance at the end toward the transmitting station. The ground acts as an imperfect conductor resulting in horizontal components of electric field which induce EMF'S (voltages) in the antenna as the wave travels towards the receiver, these EMF'S adding up in the same phase at the receiver. Energy from a wave arriving from the opposite direction is largely absorbed in the termination. Hence the antenna exhibits a directional pattern in the horizontal plane with maximum response in the direction of the termination. Of course a switching means may be used to reverse the connections of the receiver and termination so that the antenna may have its maximum response in either of two opposite directions.

The means for sequentially scanning the antennas may comprise diode switching means and a computing means can be provided which performs the following functions:

a. Sends pulses to the diode switching means to cause said sequential scanning, b. determines which antenna is receiving the largest amplitude signal, c. forms the ratios $A_{+1}/A_0$ and $A_{-1}/A_0$, d. calculates from the magnitudes of said ratios the amount that the bearing of said radio signal differs from said approximate bearing, e. calculates from the relative magnitudes of said ratios the direction, clockwise or anticlockwise, that the bearing of said radio signal differs from said approximate bearing.

Means are preferably provided to display the bearing of the radio signal. An oscilloscope or a digital read out device may be used to display the bearing of the radio signal.

By converting the amplitudes of the signals from the antennas in an analog-to-digital convertor to digital form, a digital computing means may be used.

BRIEF DESCRIPTION OF THE DRAWING

FIG. 2 illustrates measured radiation patterns for three Beverage antennas, and FIG. 3 shows the relative response of antennas +1 and −1 with respect to antenna 0, the relative responses being shown by plotting the ratios $A_{+1}/A_0$ and $A_{-1}/A_0$ versus azimuth in degrees.

DESCRIPTION OF THE PREFERRED EMBODIMENTS

Figure 1:
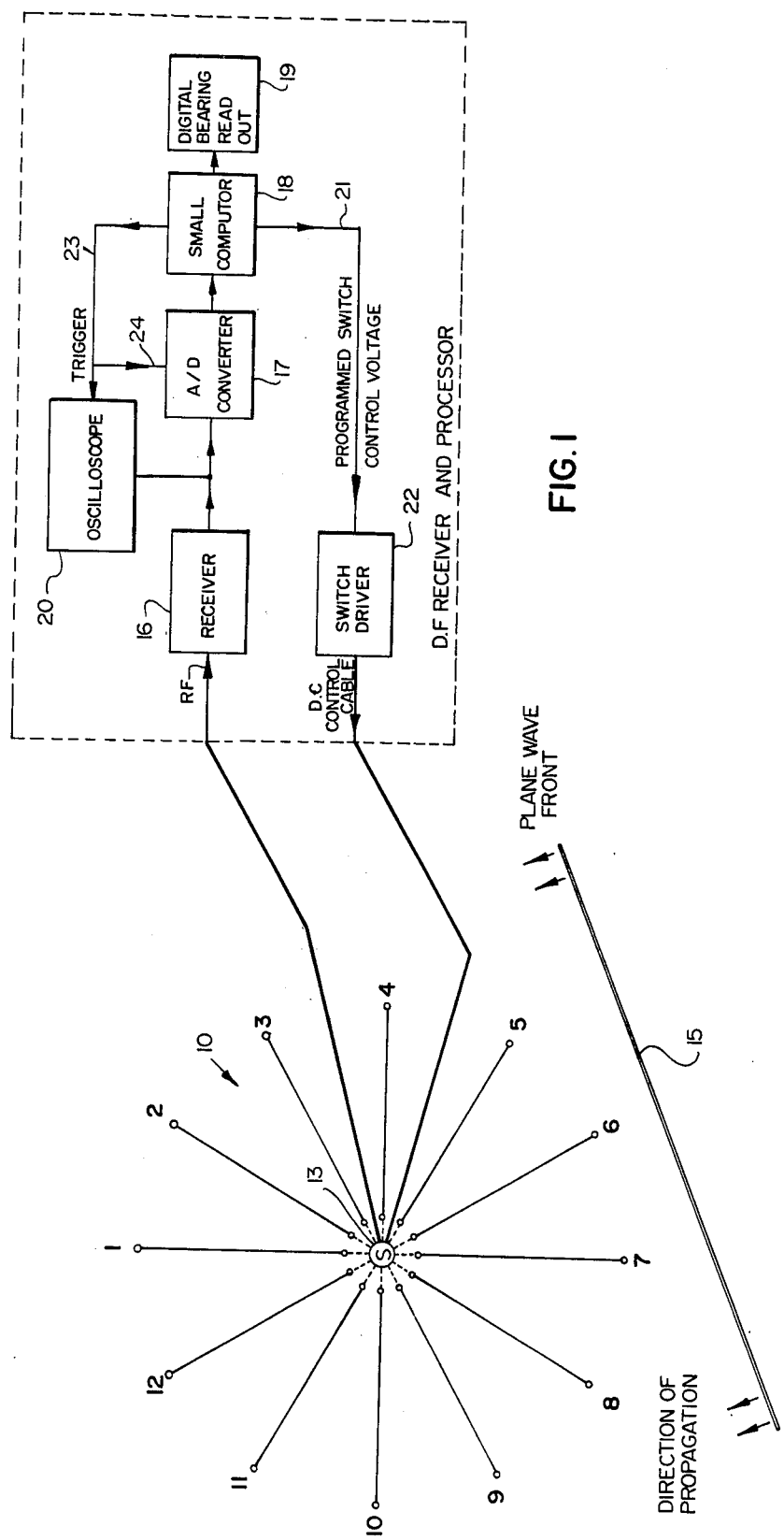
FIG. 1 diagrammatically illustrates a system in accordance with the present invention.

Referring to FIG. 1, there is shown a rosette array, generally indicated at 10, of 12 directional antennas that have overlapping field patterns. A diode switch 13 is used to obtain instantaneous sequential samples of the twelve antenna terminal voltages. The antenna with the largest terminal voltage defines the approximate bearing of the incoming radio signal. The more precise bearing is obtained by comparing the terminal voltages on the two adjacent antennas, in a manner to be described later on.

The rosette array of antennas results in twelve fixed beams with widths of 40°, separated by 30 ° in azimuth. The area occupied by an actual antenna array could be reduced by ½ of that shown in FIG. 1, since two beams pointed in opposite direction can be obtained with each Beverage antenna by sampling the voltages at either end, as discussed above. Therefore, six of the antennas shown could be eliminated. Of course fewer or more antennas could be used if desired, the arrangement shown in FIG. 1 being exemplary.

The diode switch 13 comprises a single pole 12 position switch and it is conveniently housed at the center of the array. The switch 13 is controlled remotely at the receiving station and is capable of being switched within a fraction of a millisecond. The switch 13 allows for rapid sequential measurement of the twelve antenna terminal voltages in a time short compared to the fading rate of HF signals, the system according to the invention being particularly useful in connection with HF signals, although not limited thereto. Therefore, the amplitude of HF radio signals can be assumed to be constant during these short measurement periods.

A plane wave 15 is shown impinging on the array 10 and this will induce terminal voltages in the twelve antennas comprising the array. The maximum response will occur on antenna 6 because the bearing of the beam of this antenna is closest to the bearing of the radio signal being received. Furthermore, the response of antenna 7, although less than antenna 6, will be greater than antenna 5. From a measurement of the maximum response, one can deduce that the bearing of the signal is roughly 150°. The bearing can be obtained with greater precision, as will be shown shortly, by considering the relative response of antennas 7 and 5 with respect to antenna 6.

Typical measured radiation patterns for a Beverage antenna are given in FIG. 2. If the rosette array is placed on homogeneous ground, its radiation patterns can be assumed to be symmetrical. To ensure reliability of these curves, the three-dimensional radiation patterns of the antennas should be measured accurately. The curves shown are for three adjacent antennas of a rosette array which are separated by 30° in azimuth, as per FIG. 1. The relative response of antenna +1 with respect to antenna 0, $A_{+1}/A_0$, expressed in dB, is given in FIG. 3. Similarly, the relative response of antenna −1 with respect to antenna 0, $A_{-1}/A_0$ is also given.

It can be seen from FIG. 3 that the aforementioned ratios give an indication of the amount that the bearing of the radio signal differs from the approximate bearing determined from whichever antenna receives the largest amplitude signal. For example, $A_{-1}/A_0$ may be determined to be say, −4.5 dB whereas $A_{-1}/A_0$ may be determined to be −16.5 dB. In this case, the difference in bearing of the signal from the approximate bearing is seen to be about +7°. Obviously, if the magnitudes of the two ratios were reversed, it would mean that the bearing of the radio signal differs from the approximate bearing by −7°.

It will be appreciated that the curves shown in FIG. 3 can be expressed in tabular form and stored in the memory of a small computer. The computer can then determine the ratios, refer to the table stored in its memory, and determine the amount and direction by which the radio signal differs in bearing from the approximate bearing established by finding which antenna is receiving the strongest amplitude signal.

The instrumentation required to give digital bearing readouts automatically is shown in FIG. 1. It consists of a receiver 16 whose output is rectified to give time separated DC pulses, with magnitudes proportional to the amplitudes of the RF signals at the antenna terminals. These output signals from receiver 16 are digitized in the analog-to-digital converter 17 and stored in the small computer or electronic calculator 18. Selection of the largest signal is performed in the computer 18 and stored in a memory space which may be termed $A_0$. The two adjacent voltage levels are then stored in spaces $A_{-1}$ and $A_{+1}$. The computer or calculator 18 performs two divisions to arrive at the ratios discussed previously and calculates the bearing by comparing these ratios with the tabular data stored in its memory and based on FIG. 3. The result may be stored in the computer and displayed on a digital bearing readout device 19. In addition, the result may be displayed on an oscilloscope 20.

In addition to the above function, the computer 18 controls, via lead 21 and switch driver 22, the sweep of the diode switch 13 and triggers, via leads 23 and 24, the anolog-to-digital converter 17 as well as, via lead 23, the oscilloscope 20 at the beginning of each sweep.

The present invention provides a simple system for finding the bearing of a radio signal and does not require beam forming or steering. Only signal amplitudes are measured and the digital processing requirements are relatively modest. Standard electronic components may be used. The system can be fully automated and is capable of obtaining bearings rapidly, depending on band width employed. For example, it may take up to 70 bearings per second, the time taken for one bearing T in terms of the band width BW being given by (T ≈ 12/BW).

By using wide band, sensitive, inexpensive antenna elements, for example Beverage antennas, system losses due to impedance mismatches are eliminated. There are no moving mechanical parts, narrow band widths can be used and accurate bearing measurements, e.g. + or − 1° can be obtained.

While the system shown in FIG. 1 is a digital system, an analog system could also be used.

We claim:

1. A method of determining the bearing of a radio signal comprising sequentially scanning, in a time period short compared to the typical fading period of an HF signal, a plurality of directional antennas arranged in a rosette array to determine which antenna is receiving the largest amplitude signal which indicates the approximate bearing of the radio signal, and making comparisons of said largest amplitude signal with the signal amplitudes of two adjacent antennas in the array, said comparisons being indicative of the amount and direction that the bearing of the radio signal differs from said approximate bearing.

2. A method as claimed in claim 1 wherein said largest amplitude signal may be designated $A_0$ and the signal amplitudes of the two adjacent antennas may be designated $A_{+1}$ and $A_{-1}$, said comparisons involving forming the ratios $A_{+1}/A_0$ and $A_{-1}/A_0$, the magnitudes of the ratios being indicative of the amount that the bearing of the radio signal differs from said approximate bearing and the relative magnitudes of the two ratios being indicative of the direction, clockwise or anticlockwise, that the bearing of the radio signal differs from said approximate bearing.

3. A system for determining the bearing of a radio signal comprising a rosette array of directional antennas, means for sequentially scanning said antennas in a time period short compared to the typical fading period of an HF signal, means for detecting the amplitudes of signals received by said antennas, means for determining which antenna is receiving the largest amplitude signal to thereby provide an indication of the approximate bearing of the radio signal, means for forming the ratios $A_{+1}/A_0$ and $A_{-1}/A_0$, where $A_0$ is the largest amplitude signal, $A_{+1}$ is the amplitude of signal being received by the antenna next adjacent in the array to the antenna receiving the largest amplitude signal, and $A_{-1}$ is the amplitude of signal being received by the antenna immediately preceding in the array the antenna receiving the largest amplitude signal, and means for determining from the magnitudes of said ratios the amount and direction that the bearing of said radio signal differs from said approximate bearing.

4. A system as claimed in claim 3 wherein said antennas are Beverage antennas.

5. A system as claimed in claim 4 wherein said means for sequentially scanning said antennas comprises diode switching means and a computing means performs the following functions:
   a. sends pulses to the diode switching means to cause said sequential scanning,
   b. determines which antenna is receiving the largest amplitude signal,
   c. forms the ratio $A_{+1}/A_0$ and $A_{-1}/A_0$,
   d. calculates from the magnitudes of said ratios the amount that the bearing of said radio signal differs from said approximate bearing,
   e. calculates from the relative magnitudes of said ratios the direction, clockwise or anticlockwise, that the bearing of said radio signal differs from said approximate bearing.

6. A system as claimed in claim 3, including means to display the bearing of said radio signal.

7. A system as claimed in claim 3, wherein an analog-to-digital converter is used to convert the amplitudes of said signals into digital form.

* * * * *